June 30, 1931.  J. G. COLLINS  1,812,585

ENGINE STAND

Filed Sept. 21, 1928   2 Sheets-Sheet 1

INVENTOR
James G. Collins
BY Chappell & Earl
ATTORNEYS

June 30, 1931. J. G. COLLINS 1,812,585
ENGINE STAND
Filed Sept. 21, 1928  2 Sheets-Sheet 2
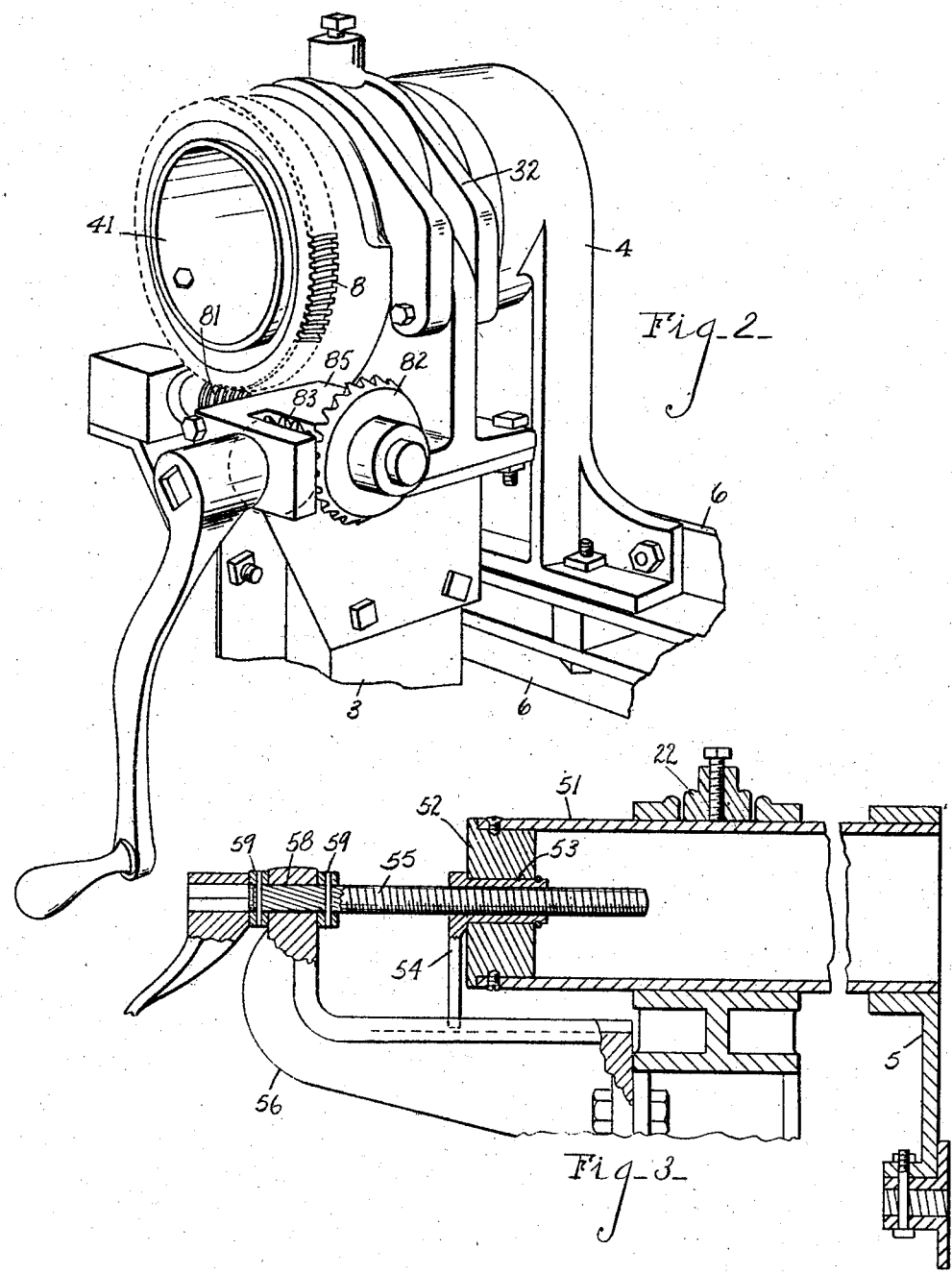
INVENTOR
James G. Collins
BY Chappell & Earl
ATTORNEYS Patented June 30, 1931

1,812,585

UNITED STATES PATENT OFFICE

JAMES G. COLLINS, OF KALAMAZOO, MICHIGAN, ASSIGNOR TO ATLAS PRESS COMPANY, OF KALAMAZOO, MICHIGAN

ENGINE STAND

Application filed September 21, 1928. Serial No. 307,367.

The main objects of this invention are:

First, to provide an improved portable stand for automobile gas engines or the like, that is very rigid and completely adjustable.

Second, to provide improved longitudinally adjustable trunnion means for such an engine stand.

Third, to provide improved rotary adjusting means for the trunnions of such a stand.

Fourth, to provide improved adjustable engaging jaws for the engine support means.

Objects pertaining to details and economies of construction and operation will definitely appear from the description to follow. The invention is clearly defined in the claims. An engine stand embodying my invention is clearly illustrated in the accompanying drawings, in which:

Fig. 2 is an enlarged detail perspective view of the right hand trunnion of the stand taken from the opposite side from that shown in Fig. 1, showing the angular adjusting worm gear means for the angular adjusting of the trunnion and the clamp hinge. The dotted lines show the continuity of the teeth of the worm gear.

Fig. 3 is an enlarged detail longitudinal sectional elevation on line 3—3 of Fig. 1 of the left hand trunnion and end of the stand as seen in Fig. 1, showing the longitudinal adjustment of the trunnion in its bearing support.

The parts will be identified by their numerals of reference which are the same in all the views.

1 is the base provided with the usual floor wheels and adjustable caster. 2 and 3 are upright standards at the opposite ends of the base. 4 is a trunnioned clamp head with a trunnion 41 adapted to angular adjustment. 5 is a trunnion clamp head with trunnion 51 adapted to a longitudinal adjustment. 6, 6 are the clamp supporting cross bars held in spaced relation by spacer block 61 to form adjusting slots 62 therebetween.

Figure 1:
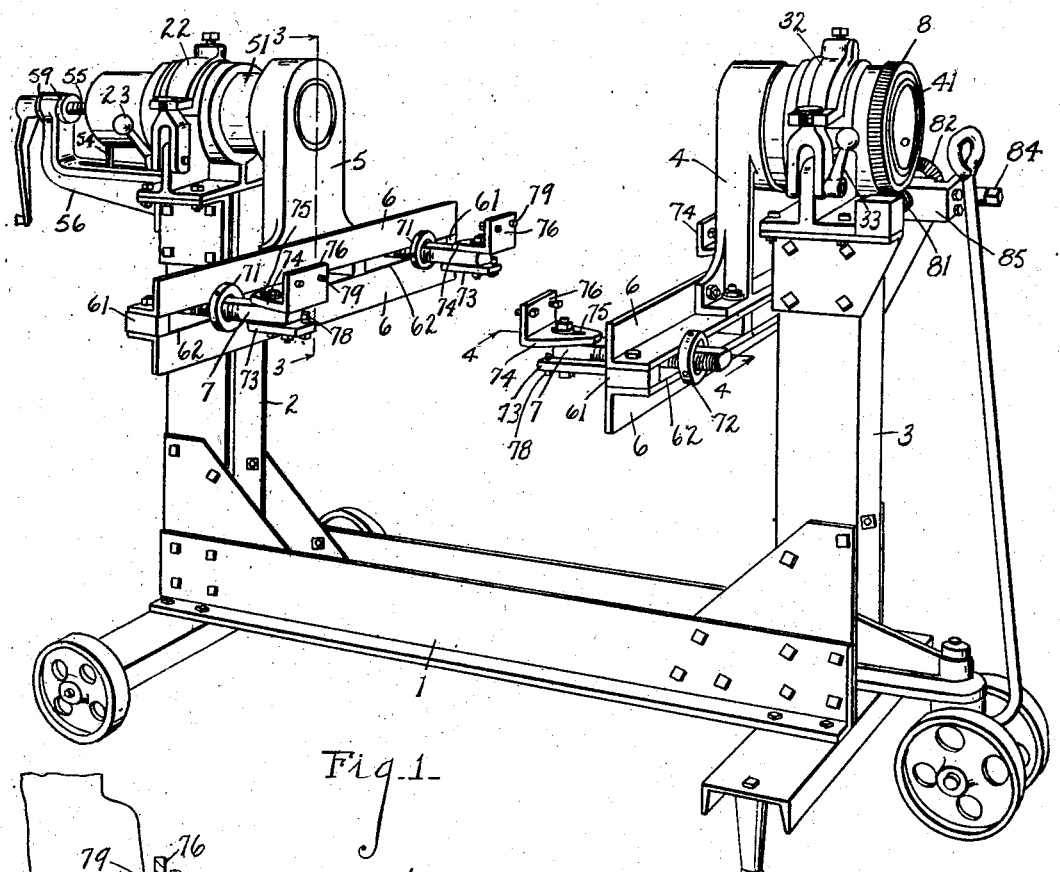
Fig. 1 is a perspective view of my improved engine stand.
Figure 4:
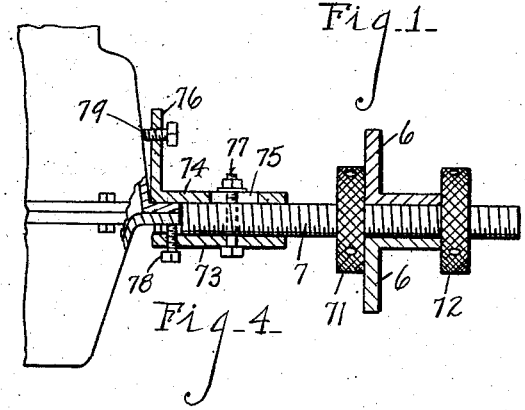
Fig. 4 is an enlarged detail central sectional elevation on line 4—4 of Fig. 1 showing one of the adjustable supporting clamps for engaging the motor casing flange.
Figure 5:
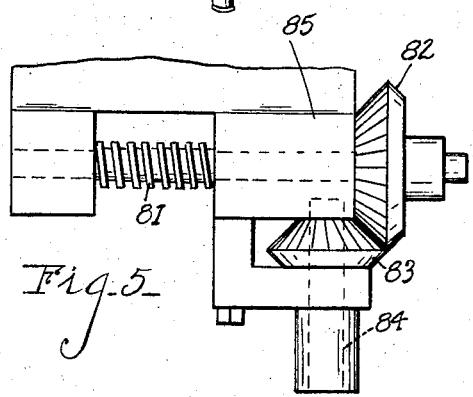
Fig. 5 is an enlarged detail plan view of the actuating pinion and gears for the worm tilting means for angular adjustment of the work.
Figure 6:
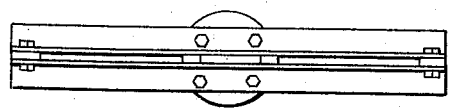
Fig. 6 is a detail elevation view of a modified form of the adjustable clamp support cross arm disposed diametrically across the trunnion in place of offset.

A series of clamps are provided on each clamp supporting cross bar. 7 is one of the adjustable clamp supporting shanks comprising a screw flattened on the opposite sides and disposed to slide adjustably along the clamp cross bars 6 or to be adjusted laterally therethrough. This adjustment and clamping are accomplished by the opposed clamp screws 71, 72, see Fig. 4.

The clamp is made up of a lower fixed member 73 and an adjustable top member 74 slotted at 75 and having an upwardly projecting arm 76. The adjustment and clamping is accomplished by the cross bolts 77 disposed in the longitudinal slot 75 in the upper clamp member 74. Clamp screw 78 for adjustment is disposed in the lower clamp member 73 and clamp set screws 79 are disposed laterally of the upwardly projecting arm 76. The manner of the attaching of this clamp to the flange of an engine or casing appears clearly in Fig. 4. A plurality of clamps are provided for each top bar.

The angular adjustment of trunnion 41 is accomplished by the worm gear 8 thereon which is acted upon by the worm 81 on the shank of which is the gear 82 driven by the pinion 83 on the crankshaft 84, all of which parts are suitably carried and supported in the block 85 carried on the upper end of the standard 3. The operation will be readily understood from an examination of Figs. 2 and 3.

The trunnion 41 is held in adjusted position by the clamping cap 32 adjusted by the eccentric lever 33.

The longitudinal adjustment of trunnion 51 is accomplished by a longitudinally disposed adjusting screw. A head 52 is provided in the outer end of the trunnion 51 and there is centrally journalled therein a nut 53 retained by suitable means and having a laterally projecting finger 54 to hold it against turning and permitting the trunnion to be turned thereon.

An adjusting screw 55 is provided for engagement with the nut 53 and this is carried on bracket 56 which has a journal bearing 58 for suitable journal on said screw, the same being provided with thrust bearings 59, 59, see Fig. 3.

By use of a crank or wrench this screw can be adjusted and carry the trunnion 51 axially out and in to any desired position by the clamping cap 22 which is provided with eccentric lever 23.

I desire to state that my improved engine stand can be considerably modified in its details without departing from my invention. The adjusting features of either of the trunnions can be made use of independently of the other although they both cooperate to secure very effective support and adjustment of the engine.

I wish to claim the invention in its specific form and also to claim it broadly as pointed out in the appended claims.

Having thus described my invention, what I claim as new and desire to secure by Letters Patent, is:

1. In an engine stand, the combination of a suitable base with standards, trunnioned clamp heads in suitable trunnion bearings on said standards, clamps for the said heads comprising a pair of parallel angle bars supported in spaced relation, clamps adjustable thereon each comprising a shank formed of flattened screws and adjusting nuts thereon for adjusting lengthwise of said shank and clamping it in adjusted position on said arm, clamp members on said shank comprising a fixed clamp member on the under side of said shank, an adjustable clamp member on the top of said shank having a longitudinal slot, adjusting set screws, and a retaining bolt through said member and in said slot, as specified.

2. In an engine stand, the combination of a suitable base with standards, trunnion clamping crossheads carried thereby the trunnions of one of which is adjustable longitudinally by means comprising a head in said trunnion, a journalled nut in said head, an adjusting screw to act through said nut, and means for preventing the turning of said nut and permitting the turning of the trunnion head, as specified.

3. In an engine stand, the combination of a suitable base with standards, trunnion clamping crossheads each comprising a pair of clamp jaws carried thereby the trunnions of one of which is adjustable longitudinally, and an axially disposed adjusting screw for such adjustment, as specified.

In witness whereof I have hereunto set my hand.

JAMES G. COLLINS.